Sept. 28, 1965  G. D. ROCKEFELLER, JR  3,209,204
PHASE TO GROUND PROTECTIVE SYSTEMS
Filed Feb. 5, 1962  2 Sheets-Sheet 1

Sept. 28, 1965  G. D. ROCKEFELLER, JR  3,209,204
PHASE TO GROUND PROTECTIVE SYSTEMS
Filed Feb. 5, 1962 2 Sheets-Sheet 2

United States Patent Office 3,209,204
Patented Sept. 28, 1965

3,209,204
PHASE TO GROUND PROTECTIVE SYSTEMS
George D. Rockefeller, Jr., Morris Plains, N.J., assignor to Westinghouse Electric Corporation, East Pittsburgh, Pa., a corporation of Pennsylvania
Filed Feb. 5, 1962, Ser. No. 170,991
13 Claims. (Cl. 317—18)

This invention relates to protective relay assemblies and it has particular relation to relay assemblies for protecting alternating electric systems in response to the occurrence of line-to-ground faults on such systems.

Alternating electric systems may be resistance-grounded or solidly-grounded. Solidly-grounded systems are in the majority in this country. The invention is particularly suitable for the solidly-grounded systems.

In accordance with the invention a distance relaying assembly is located at a relaying station on a polyphase electric system to be protected. Polyphase voltages derived at the relaying station are compensated by series compensators for the purpose of producing a set of compensated polyphase relaying voltages which represent the voltages present at a predetermined point on the electric system which is substantially displaced from the relaying station. This point will be referred to as the balance point or reach of the relaying assembly.

From quantities available at the relaying station a voltage is derived which represents the zero-sequence voltage at the balance point if the fault is at that point or beyond. If a line-to-ground fault occurs on the electric system at the balance point it will be found that the derived zero sequence voltage is equal in magnitude and opposite in phase to the line-to-neutral voltage at the balance point of the grounded line. Line-to-neutral voltage is defined as the sum of the positive-and-negative sequence voltages. The relaying assembly is responsive to the difference between this derived zero-sequence voltage and the derived line-to-neutral voltage of the grounded line.

If the fault occurs at a point on the electric system between the balance point and the relaying station the derived zero-sequence voltage becomes larger than the line-to-neutral voltage of the grounded line and the relaying assembly trips an associated breaker.

If the line-to-ground fault occurs on the electric system at a point beyond the balance point the derived zero-sequence voltage is smaller than the line-to-neutral voltage with which it is compared and the relaying assembly does not trip the circuit breaker.

The response of the relaying assembly is inherently directional. This means that the relaying assembly does not respond to a ground fault if the relaying station is located between such a ground fault and the balance point. Such a fault may be said to be behind the relaying assembly. In some cases the relaying assembly may respond to a ground fault which is slightly behind the relaying station. Under certain conditions this may provide back-up protection for such close-in faults.

For some applications the relaying assembly may overreach slightly in response to two-line-to-ground faults. When the relaying assemblies are employed for protecting the conventional zones 1, 2 and 3 of an electric system the slight tendency to over reach for two-line-to-ground faults when a moderate amount of fault resistance is present between the phases would not be objectionable for the zones 2 and 3 applications. However, in some cases the overreach may not be desirable for a zone 1 application where accuracy of reach is of greater importance. For such cases the invention further contemplates that a two-line-to-ground fault in the vicinity of the balance point will block or restrain operation of the relaying assembly.

It is therefore an object of the invention to provide an improved relaying assembly responsive to line-to-ground faults.

It is also an object of the invention to provide an improved relaying assembly employing static components which is responsive to single-line-to-ground faults.

It is a further object of the invention to provide an improved relaying assembly which is responsive to single-line-to-ground faults and which is substantially directional.

It is another object of the invention to provide a distance relaying assembly which is responsive to single-line-to-ground faults and which has reduced sensitivity in the presence of two-line-to-ground faults.

It is an additional object of the invention to provide a distance relaying assembly which compares zero-sequence voltage referred to a predetermined point on a polyphase-system-to-be-protected with the line-to-neutral voltage of a line having a ground fault thereon.

It is still another object of the invention to provide a relaying assembly as defined in the preceding paragraph wherein the sensitivity of the relaying assembly is decreased in the presence of a two-line-to-ground fault.

Other objects of the invention will be apparent from the following description taken in conjunction with the accompanying drawings, in which.

Figure 1:
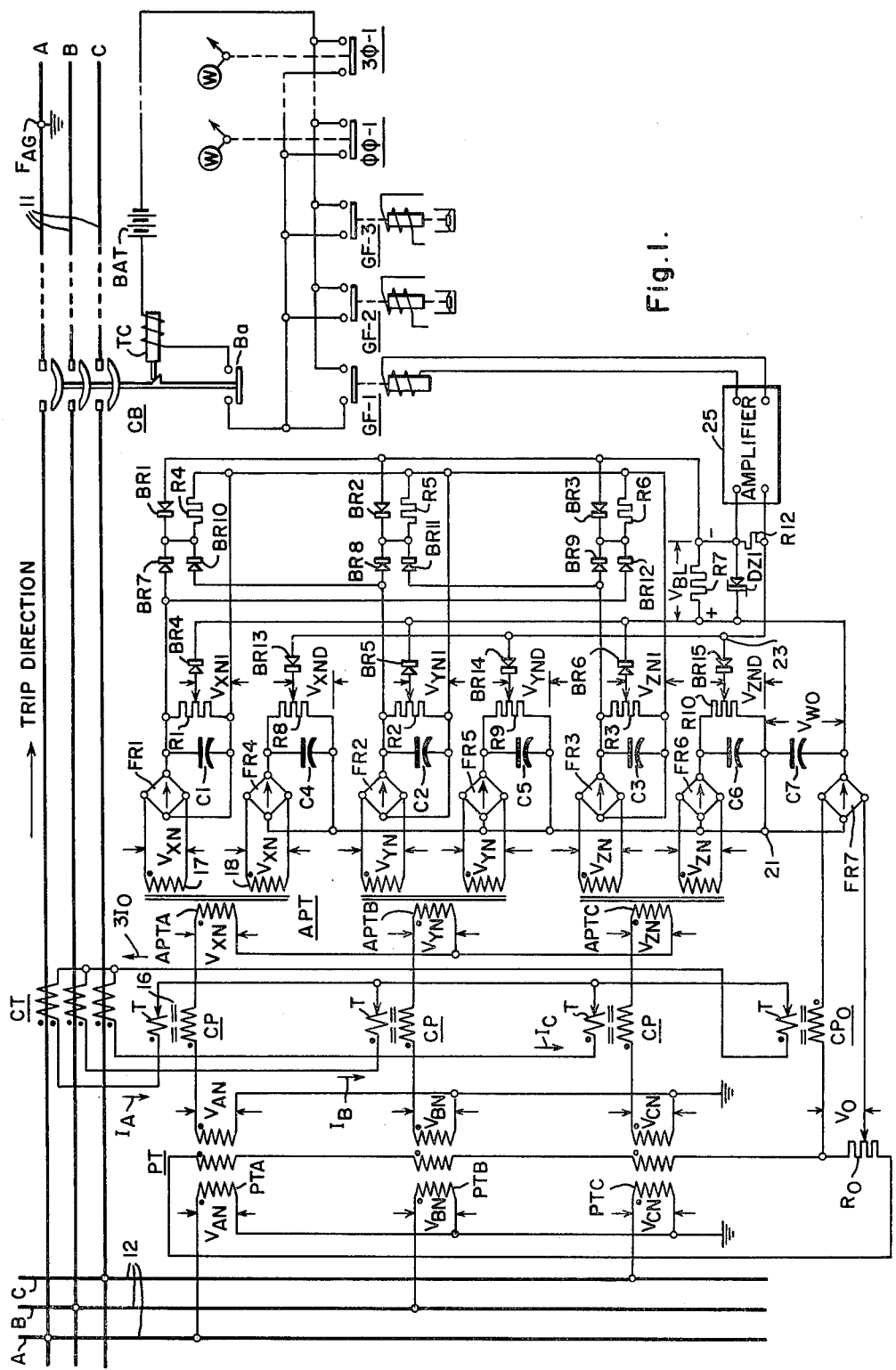
FIGURE 1 is a schematic view of a polyphase electric system protected by a relaying assembly embodying the invention.

Referring to the drawings FIG. 1 shows a three-phase line section 11 which is to be protected. This line section has lines or phase conductors A, B and C. The line section is connected at a relaying station to a three phase bus 12 through a circuit breaker CB. A set of line-current transformers CT derive the currents $I_A$, $I_B$ and $I_C$ and the star-point current $3I_0$ for relaying purposes wherein $I_0$ is the zero sequence component of the line currents. A set of potential transformers PT is employed for deriving the line- or bus-voltages-to-neutral respectively $V_{AN}$, $V_{BN}$ and $V_{CN}$ for relaying purposes. It will be noted that the potential transformers have three primary windings PTA, PTB and PTC connected in star with a grounded neutral. Each of the primary windings has two secondary windings associated therewith. One set of the secondary windings is connected in star with a grounded neutral to provide the secondary line-to-neutral voltages $V_{AN}$, $V_{BN}$ and $V_{CN}$. (To simplify the presentation a one-to-one transformer ratio is assumed.) The remaining set of secondary windings is connected in a closed series circuit with a resistor $R_0$ which serves as a voltage divider. The output of the voltage divider is a voltage $V_0$ which represents the zero-sequence-component of the line voltages.

In FIG. 1 conventional polarity markings are applied to the various transformer windings.

Figure 2:
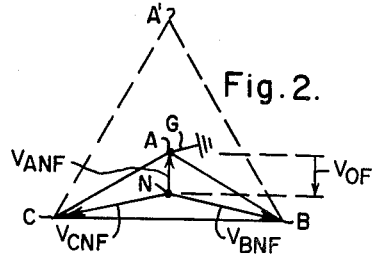
FIGS. 2, 2A, 3, 3A, 4 and 4A are vector diagrams showing vector relationships which may occur in the system of FIGURE 1.

Let it be assumed that a fault-to-ground $F_{AG}$ occurs on the line A of the line section 11. If the circuit breaker CB is closed the voltage conditions at the fault are substantially as shown in FIG. 2. In FIG. 2 the voltages $V_{ANF}$, $V_{BNF}$ and $V_{CNF}$ represent respectively the line-to-neutral voltages of the lines A, B and C. The zero-sequence-component of the line-to-ground voltages at the point of fault is represented by a vector $V_{OF}$ which is equal in magnitude and opposite in phase to the voltage $V_{ANF}$. The triangle which includes the base BC and the two dotted lines BA' and A'C represent the conventional triangle of line voltages existing before the occurrence of the fault.

Figure 2A:
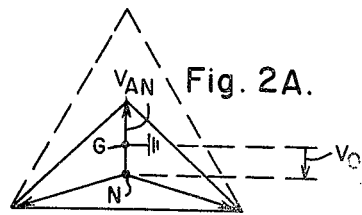

FIG. 2A shows the corresponding voltages at bus 12, some distance from the fault point.

If similar vector diagrams are prepared for a single-line-to-ground fault occurring on the line B or the line C at the same point it will be found that in each case the zero-sequence voltage $V_{OF}$ is equal in magnitude and opposite in phase to the line-to-neutral-voltage of the faulted line. In the relaying assembly of FIG. 1 a voltage corresponding to the zero-sequence-component $V_{OF}$ is compared with the smallest of the voltages $V_{ANF}$, $V_{BNF}$ and $V_{CNF}$. The circuits for effecting this comparison now will be considered.

It will be recalled that across three secondary windings of the potential transformers voltages $V_{AN}$, $V_{BN}$ and $V_{CN}$ are derived which correspond to the three line-to-neutral voltages of the associated bus. Although the transformers may have any desired transformation ratio, for present purposes it will be assumed that the transformers have a one-to-one transformer ratio. The voltages $V_{AN}$, $V_{BN}$ and $V_{CN}$ across the secondary windings of the potential transformer PT are applied through three compensators CP respectively across the primary windings APTA, APTB and APTC of an auxiliary potential transformer APT. These primary windings are connected in star but with the neutral point ungrounded.

The compensator CP associated with the voltage $V_{AN}$ has its primary winding T energized in accordance with the current $I_A$. If the impedance introduced by the compensator CP is made equal to the positive-sequence impedance from the relaying station to the point of fault $F_{AG}$ the difference between the voltage $V_{AN}$ and the drop across the compensator is a voltage $V_{XN}$ which is applied across the primary winding APTA of the auxiliary potential transformers associated therewith. The voltage $V_{XN}$ corresponds to the voltage $V_{ANF}$ of FIG. 2.

Each of the compensators CP preferably is provided with a tapped primary winding T having a small number of turns and a secondary winding having a larger number of turns, the two windings being interlinked to an air-gapped core 16 so that the compensator voltage which is generated in the secondary winding 15 will be substantially 90° or less out of phase with the current which flows through the primary winding T. The compensator may be similar in construction to that shown in Patent 2,973,459 of W. K. Sonnemann and in patent application Serial No. 91,394 filed February 24, 1961, by William K. Sonnemann. As shown in the aforesaid patent, resistance may be connected across a portion of the secondary winding of the compensator to control the phase relationship between the compensator voltage and the primary current. The air-gap compensator provides an effective transient shunt which tends to remove any direct-current transient from the energy supplied to the relays. It should be noted that no conductive connection exists between the circuits of the current and potential transformers.

In an analogous manner the voltage $V_{BN}$ is associated with a compensator CP which has its primary winding energized by the current $I_B$ to provide a voltage $V_{YN}$ which corresponds to the voltage $V_{BNF}$ of FIG. 2. The voltage $V_{CN}$ is associated with a compensator having its primary winding energized by a current corresponding to the current $I_C$ to produce a voltage $V_{ZN}$ which corresponds to the voltage $V_{CNF}$ of FIG. 2.

Each primary winding of the auxiliary potential transformers has two secondary windings associated therewith. For example, the primary winding associated with the voltage $V_{XN}$ has two secondary windings 17 and 18. It will be assumed that the transformer ratio in each case is a one-to-one ratio, and the reference character $V_{XN}$ will be employed for the voltage across each of the windings.

The voltage $V_{XN}$ across the secondary winding 18 is applied to the input terminals of a full wave rectifier FR4. The output terminals of the rectifier are connected across a load resistor R8 which has a filter capacitor C4 shunted thereacross. Thus, a direct voltage appears across the resistor R8 which corresponds to the voltage $V_{XN}$. In a similar manner, a direct voltage is applied across a resistor R9 which corresponds to the voltage $V_{YN}$ and a direct voltage is applied across a resistor R10 which corresponds to the voltage $V_{ZN}$.

It will be recalled that the voltage $V_0$ derived from the resistor $R_0$ corresponds to the zero-sequence component of the bus voltages. The voltage $V_0$ is associated with a compensator $CP_0$ which is similar in construction to the compensators CP previously discussed but which provides an impedance equal to one-third of the zero-sequence impedance of the line section from the relaying station to the point of fault $F_{AG}$. The primary winding of the compensator $CP_0$ is energized by the residual current component $3I_0$. The sum of voltage $V_0$ and the voltage generated by the compensator $CP_0$ corresponds to the voltage $V_{OF}$ of FIG. 2 and is applied across the input terminals of a full wave rectifier FR7. The direct voltage output $V_{WO}$ of the rectifier is applied across a filter capacitor C7.

The voltage $V_{WO}$ across the capacitor C7 is compared with the smallest of the voltages across or derived from the resistors R8, R9 and R10. To this end a terminal 23 is connected to a tap on each of the resistors R8, R9 and R10 through a separate rectifier BR13, BR14 or BR15. The taps provide voltages $V_{XND}$, $V_{YND}$ and $V_{ZND}$ respectively. A terminal 21 is connected to the negative end of each of the resistors R8, R9 and R10 and to the negative output terminal of the rectifier FR7. The positive output terminal of the rectifier FR7 is connected to the terminal 23 through a resistor R7, and a resistor R12.

Let it be assumed that the voltage $V_{XND}$ across the output part of the resistor R8 is less than the output voltage of the rectifier FR7 and that the latter is smaller than the voltages $V_{YND}$ and $V_{ZND}$ across the output parts of the resistors R9 and R10. The rectifiers BR14 and BR15 block the flow of current from the resistors R9 and R10 through the rectifier BR13 and the resistor R8 to the common terminal of the resistors. However, current can flow from the positive terminal of the rectifier FR7 through the resistors R7 and R12, the rectifier BR13, the lower part of the resistor R8 and the terminal 21 to the negative terminal of the rectifier FR7. Thus, a current flows which is dependent on the difference between the voltage $V_{WO}$ and the smallest of the three voltages $V_{XND}$, $V_{YND}$ and $V_{ZND}$ in this case $V_{XND}$.

A system may be so designed that the voltage across the resistor R12 is employed directly for tripping the circuit breaker CB. In the embodiment of FIGURE 1 the circuit breaker CB is provided with a trip coil TC and an auxiliary switch Ba. The auxiliary switch is closed when the circuit breaker is closed and is open when the circuit breaker is open. The trip coil is connected through the auxiliary switch across the make contacts of a relay GF–1. The operating coil of the relay GF–1 is energized in accordance with the voltage across the resistor R12 through a suitable amplifier 25.

In the application of distance-relaying protection to line sections it is common practice to divide the line section to be protected into three overlapping zones which are referred to as zones 1, 2 and 3. It will be assumed that the relay GF and its energizing circuits are designed to provide zone 1 protection for the line section 11 against single-line-to-ground faults. The operation of the portion of FIGURE 1 which has been described in detail above now will be reviewed.

Each of the compensators CP has an impedance $Z_C$ which is defined as the ratio of secondary induced voltage to primary current. A suitable construction for the compensators and the application of compensators to distance relaying are discussed in a series of three papers entitled "Compensator Distance Relaying" which appeared in the June 1958 issue of Power Apparatus and Systems published in the transactions of the American Institute of Electrical Engineers, New York City.

The impedance of the compensator is selected in accordance with the zone for which it is designed or on the distance of the balance point from the relaying station. It will be assumed that the compensator impedance is equal to the positive-sequence impedance of the line section from the relaying station to the desired balance point.

The impedance of the compensator $CP_0$ is made equal to one-third the impedance $Z_C$ multiplied by the ratio of the zero-sequence impedance to the positive-sequence impedance from the relaying station to the desired balance point. Inasmuch as the impedance $Z_C$ is assumed to be equal to the positive-sequence impedance it follows that for the assumed conditions the impedance of the compensator $CP_0$ is equal to one-third the zero-sequence impedance from the relaying station to the balance point.

Let it be assumed that the circuit breaker CB is closed and that the system is operating normally. As long as no fault occurs on the line section to be protected the voltages $V_{XND}$, $V_{YND}$ and $V_{ZND}$ appearing across portions of the resistors R8, R9 and R10 are all larger than the voltage $V_{WO}$ which is the output voltage of the rectifier FR7 and no current flows through the resistor R12.

If a fault $F_{AG}$ is applied between the line A and ground at the balance point the voltage $V_{ANF}$ between the line A and neutral at the balance point drops to a value substantially lower than the values of the voltages $V_{BNF}$ and $V_{CNF}$ at the balance point. This is shown in FIG. 2. This means that the corresponding voltage outputs of the rectifiers FR4, FR5 and FR6 are altered to make the voltage $V_{XND}$ smaller than the voltages $V_{YND}$ and $V_{ZND}$. At the same time the zero-sequence voltage increases to make the voltage $V_{WO}$ equal in magnitude to the voltage $V_{XND}$ but smaller than the voltages $V_{YND}$ and $V_{ZND}$. For these conditions no current can flow through the resistor R12 and the circuit breaker CB remains closed.

Let it be assumed next that the fault $F_{AG}$ occurs not at the balance point but at a point beyond the balance point or reach of the relay assembly. For these conditions the voltage $V_{WO}$ is smaller than each of the voltages $V_{XND}$, $V_{YND}$ and $V_{ZND}$. Consequently no current flows through the resistor R12 and the circuit breaker CB remains closed.

Should the fault $F_{AG}$ occur between the line conductor and ground at point between the relaying station and the balance point, the voltage $V_{WO}$ becomes larger than the voltage $V_{XND}$. Consequently, a current now flows from the positive terminal of the rectifier FR7 through the resistor R7, the resistor R12, the terminal 23, the rectifier BR13, the lower part of the resistor R8 and the terminal 21 to the negative terminal of the rectifier FR7. The resulting input to the amplifier 25 picks up the relay GF–1 to complete a tripping circuit for the trip coil TC and the circuit breaker CB trips.

In a similar manner a single-line-to-ground fault occurring on the line B or on the line C within the reach of the relaying assembly results in the tripping of the circuit breaker CB.

The relaying assembly thus far described in detail inherently is essentially directional. The relaying assembly will respond to a single-line-to-ground fault occurring between the relaying station and the balance point. The relaying assembly will not respond to a single-line-to-ground fault occurring behind the relaying station or to the left as viewed in FIG. 1 except under certain extreme conditions which do not occur in most applications. In a few applications a fault immediately behind the relaying station involving one line and ground may trip the circuit breaker CB. Such applications occasionally may be encountered if the relaying assembly is set for third zone operation but are not likely to be encountered for relaying assemblies set for second zone operation and would not be encountered for relays set for first zone operation. When the relaying assembly is employed for third zone operation it would be provided with a substantial time delay in operation. The extension of the zone to include a small portion of the lines immediately behind the relaying station would provide a desirable backup protection for adjacent single-line-to-ground faults in such areas.

Figure 3:
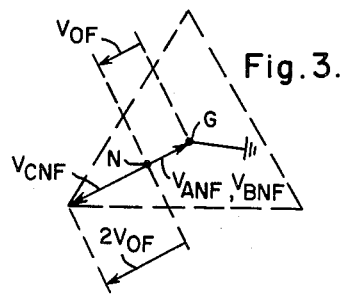
Figure 3A:
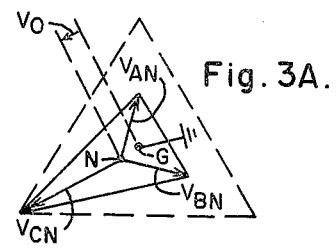

Voltage conditions existing in the presence of two-line-to-ground faults are shown in FIGS. 3, 3A, 4 and 4A. FIG. 3 shows vector relationships for voltages at the balance point when faults to ground occur on both of the lines A and B. It will be noted that the zero sequence voltage $V_{OF}$ is equal in magnitude and opposite in direction to each of the line-to-neutral voltages $V_{ANF}$ and $V_{BNF}$. The zero-sequence voltage $V_{OF}$ is in phase with the voltage $V_{CNF}$ but has only half the magnitude of the latter voltage. FIGURE 3A shows the corresponding voltages at the relaying station.

Figure 4:
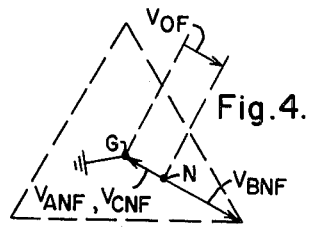
Figure 4A:
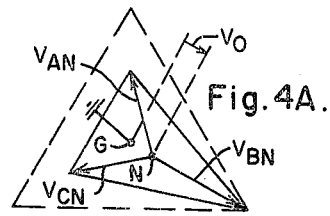

In FIGURE 4 vector relationships are shown for the voltages at the balance point when the lines A and C are grounded at the balance point. It will be noted that the zero-sequence voltage $V_{OF}$ in FIG. 4 is equal in magnitude but opposite in phase relative to the voltages $V_{ANF}$ and $V_{CNF}$. FIG. 4A shows the corresponding voltage relationships at the relaying station.

The portion of FIG. 1 which thus far has been described in detail responds to two-line-to-ground faults occurring within the reach of the relaying assembly. However, the relaying assembly may over-reach slightly on two-line-to-ground faults when a moderate amount of fault resistance is present between the faulted lines. This slight over-reach would not be objectionable in relaying assemblies for zone 2 or zone 3 operation. Although accuracy of reach is of greater importance in zone 1 applications the small over-reach on two-line-to-ground faults probably would be acceptable in a number of zone 1 applications. For those applications wherein no over-reach is desired I propose to restrain or block operation of the relaying assembly when the fault is in the vicinity of the balance point.

It will be recalled that the input circuit for the amplifier 25 includes a resistor R7. When the input to the amplifier is to be restrained or blocked a direct voltage is developed across the resistor R7 having a polarity represented by conventional polarity marks (+) for positive and (−) for negative. It will be noted that this voltage is in a direction opposing the voltage $V_{WO}$. The voltage across the resistor R7 may be made large enough to completely block operation of the amplifier 25 or it may be made merely large enough to prevent operation of the amplifier 25 in response to two-line-to-ground faults occurring beyond the rated reach of the relaying assembly. Preferably a constant bias voltage is developed by connecting a constant voltage device such as a Zener diode DZ1 across the resistor R7. When the voltage of the resistor R7 tends to exceed the breakdown voltage of the Zener diode DZ1 the diode breaks down to maintain a constant voltage thereacross.

It should be noted that the blocking of the response of the relaying assembly to two-line-to-ground faults does not impair the protection for the line section for the reason that other relaying assemblies are normally provided which respond to such faults. Examples of such relaying assembles will be found in the above-mentioned Sonnemann patent and in the above-mentioned papers published by the American Institute of Electrical Engineers.

In order to control the voltage developed across the resistor R7 a detector is provided for detecting the presence of a two-line-to-ground fault. In a two-line-to-ground fault one phase quantity differs from the corresponding quantities of the other two phases. For example, the currents in the two faulted lines are larger than the current in the nonfaulted lines. As a further example, the voltages-to-neutral of the two faulted lines are smaller than the voltage-to-neutral of the unfaulted line. Thus, if the detector can sense that one of the line currents is substantially smaller than each of the remaining line currents or that one of the line-to-neutral voltages is substantially larger than each of the remaining line-to-neutral voltages the two-line-to-ground fault conditions can be detected. In a preferred embodiment of the invention the line-to-neutral voltages $V_{XN}$, $V_{YN}$ and $V_{ZN}$ are compared. If any of these voltages is substantially larger than each of the remaining voltages, current is supplied to the resistors R7 to develop a restraining or blocking voltage.

It will be recalled that each primary winding of the auxiliary potential transformers APT is provided with two secondary windings. The three secondary windings 17 supply voltages $V_{XN}$, $V_{YN}$ and $V_{ZN}$ respectively to three full-wave rectifiers, FR1, FR2 and FR3. The outputs of the rectifiers are applied respectively across the resistors R1, R2 and R3 each of which is provided with a filter capacitor C1, C2 and C3 respectively. Each of the resistors is provided with an adjustable tap which is connected through a rectifier respectively BR4, BR5 and BR6 to the positive terminal of the resistor R7.

The output of the full-wave rectifier FR1 develops a direct voltage $V_{XN1}$ between the tap on the resistor R1 and the negative terminal of the rectifier which is dependent on the alternating voltage $V_{XN}$. The output of the rectifier FR1 also is applied through a rectifier BR7 across a resistor R4 and through a rectifier BR12 across a resistor R6 to produce across each of the resistors at least a direct voltage $V_{XN2}$ which is dependent on the voltage $V_{XN}$.

In an analogous manner the rectifier FR2 develops between the tap on the resistor R2 and the negative terminal of the rectifier a direct voltage $V_{YN1}$ which is dependent on the voltage $V_{YN}$. In addition, the output of the rectifier RF2 is applied through a rectifier BR8 across a resistor R5 and through a rectifier BR10 across the resistor R4 to develop across each of these resistors at least a voltage $V_{YN2}$ which is dependent on the voltage $V_{YN}$.

The rectifier FR3 develops between the tap on the resistor R3 and the negative terminal of the rectifier a direct voltage $V_{ZN1}$ which is dependent on the voltage $V_{ZN}$. In addition the rectifier FR3 is connected through a rectifier BR9 across the resistor R6 and through the rectifier BR11 across the resistor R5 to develop across each of these resistors at least a direct voltage $V_{ZN2}$ which is dependent on the voltage $V_{ZN}$.

The negative terminal of the resistor R7 is connected to the left hand terminals of the resistors R4, R5 and R6 respectively through the rectifiers BR1, BR2 and BR3.

The operation of the circuit for detecting two-line-to-ground faults now will be considered. Let it be assumed that the circuit breaker CB is closed and that the system is operating in normal unfaulted condition. Under such circumstances the voltages $V_{XN1}$, $V_{YN1}$ and $V_{ZN1}$ all are equal to each other. In addition, the voltages $V_{XN2}$, $V_{YN2}$ and $V_{ZN2}$ are equal to each other and are somewhat larger than the first set of voltages. These voltages are unable to direct a current through the resistor R7. This may be understood by a consideration of the circuit for the voltage $V_{XN1}$ which extends from the tap on the resistor R1 through the rectifier BR4, the resistor R7 and then through any one of three paths, namely through the rectifier BR1 and the resistor R4 or through the rectifier BR2 and the resistor R5 or through the rectifier BR3 and the resistor R6 back to the negative terminal of the resistor R1. In each of these three alternate circuits the voltage $V_{XN1}$ is opposed by a larger voltage across one of the resistors R4, R5 or R6 and the rectifier BR4 therefore blocks the flow of current though the resistor R7.

Let is be assumed next that a single-line-to-ground fault $F_{AG}$ occurs adjacent the balance point between the line A and ground. Under such circumstances the voltage $V_{XN1}$ is substantially smaller than either of the voltages $V_{YN1}$ and $V_{ZN1}$. Also the voltage $V_{XN2}$ is substantially smaller than either of the voltages $V_{YN2}$ or $V_{ZN2}$.

In considering the three alternate circuits associated with the voltage $V_{XN1}$ it will be noted that with respect to the circuit including the resistor R4 the voltage $V_{XN1}$ is opposed by the substantially larger voltage $V_{YN2}$. Consequently, this alternate circuit cannot supply current through the resistor R7. With respect to the alternate circuit including the resistor R5 the voltage $V_{XN1}$ is opposed by the larger voltage $V_{YN2}$ which equals the voltage $V_{ZN2}$. Thus, this circuit cannot supply current to the resistor R7. Finally, for the circuit including the resistor R6 the voltage $V_{XN1}$ is opposed by the larger voltage $V_{ZN2}$. Thus, no bias is developed across the resistor R7. In a similar manner it can be shown that had the single-line-to-ground fault at the balance point occurred between ground and the line B or the line C, no restraining bias would have been developed across the resistor R7.

Let is be assumed now that a two-line-to-ground fault occurs at the balance point which involves the lines A and B. In this case the voltages $V_{XN1}$ and $V_{YN1}$ are materially smaller than the voltage $V_{ZN1}$. Also, the voltages $V_{XN2}$ and $V_{YN2}$ are much smaller than the voltage $V_{ZN2}$ and are also smaller than the voltage $V_{ZN1}$. Concerning the three alternate circuits associated with the voltage $V_{XN1}$ it will be noted that for the circuit including the resistor R4 the voltage $V_{XN1}$ is opposed by a voltage $V_{XN2}$ or $V_{YN2}$ which is somewhat larger. For the circuit including the resistor R5 the voltage $V_{XN1}$ is opposed by the much larger voltage $V_{ZN2}$ and this also applies to the circuit including the resistor R6. Thus none of these circuits can develop a bias in the resistor R7.

Turning now to the three alternate circuits associated with the voltage $V_{YN1}$ it will be noted that for the circuit including the resistor R4 the voltage $V_{YN1}$ is opposed by a somewhat larger voltage $V_{XN2}$ or $V_{YN2}$. For the alternate circuit including the resistor R5 the voltage $V_{YN1}$ is opposed by a much larger voltage $V_{ZN2}$ and this also applies to the circuit including the resistor R6. Consequently, none of these three alternate circuits can develop a bias in the resistor R7.

With respect to the three alternate circuits associated with the voltage $V_{ZN1}$ it will be noted that for the alternate circuit including the resistor R4 the voltage $V_{ZN1}$ is opposed by a voltage $V_{XN2}$ or $V_{YN2}$ which is substantially smaller than the voltage $V_{ZN1}$. Consequently, a current flows from the tap on the resistor R3 through the rectifier BR6, the resistor R7, the rectifier BR1, the resistor R4 to the negative terminal of the rectifier FR3. When the voltage across the resistor R7 exceeds the breakdown voltage of the Zener diode DZ1 the diode breaks down to develop a constant bias voltage thereacross. This voltage restrains or blocks operation of the amplifier 25.

Had the two-line-to-ground fault involved the phases B and C one of the alternate circuits associated with the voltage $V_{XN1}$ would have operated in a similar manner to develop a bias across the resistor R7. Had the two-line-to-ground fault involved the lines A and C one of the alternate circuits associated with the voltage $V_{YN1}$ would have operated in a similar manner to develop a bias across the resistor R7.

The relay GF-1 is controlled to provide zone 1 protection for the line section 11. If zone 2 protection is desired for single-line-to-ground faults a relay GF-2 may be provided which has a control similar to that of relay GF-1 except that it is provided with a longer reach suitable for zone 2 protection. The only other difference is that the relay GF-2 is provided with a substantial time delay which is conventional for zone 2 protection. The time delay may be provided in a manner similar to that shown in the aforesaid Sonnemann patent.

If zone 3 protection is desired for single-phase-to-ground faults a relay GF-3 may be provided which has a control similar to that provided for the relay GF-1 except that the relay control is provided with a reach suitable for zone 3 protection. In addition, the relay GF-3 is designed to operate with a time delay which is greater than that that provided for the relay GF-2.

The trip coil TC also may be connected for operation in response to phase-to-phase faults and three phase faults. Thus, in FIG. 1 a relay ɸɸ–1 is provided which is responsive to phase-to-phase faults. This relay may be similar to the relay bearing the same reference character shown in the aforesaid Sonnemann patent. The relay is assumed to provide zone 1 protection. Three-phase fault protection is provided by a relay 3ɸ–1 which may be similar to the relay having the same reference character in the aforesaid Sonnemann patent. This relay again is assumed to provide zone 1 protection against three-phase faults. If zone 2 and zone 3 protection against phase-to-phase and three-phase faults are desired similar phase-to-phase and three-phase fault relays may be provided for zone 2 and zone 3 protection in the manner discussed in the aforesaid Sonnemann patent.

The additional relays assure full protection in certain extreme cases which are unlikely to be encountered. For example consider the rare system wherein the zero-sequence-component of current is substantially zero for a close-in-line-to-ground fault condition. Even though the relay GF–1 should fail to respond to this condition it can be shown that such a condition would cause the relay ɸɸ–1 to operate to protect the system.

It should be noted that with the provision of thse relays responsive to phase-to-phase faults the blocking or restraining of the relay GF–1 for two-line-to-ground faults does not eliminate protection for the reason that the appropriate phase-to-phase relays such as the relay ɸɸ–1 operates in response to such faults.

Provision is made in FIG. 1 for restraining or blocking operation of the relay GF–1 in the presence of two-line-to-ground faults adjacent the balance point. As previously pointed out such restraint or blocking generally is not required for zone 2 and zone 3 operations. For this reason such restraint may be omitted for the relays GF–2 and GF–3.

The taps on the resistors R1, R2 and R3 may be adjusted to provide any desired ratio of voltages necessary to produce a restraining or blocking operation. As representative of suitable parameters the taps may be adjusted to provide the restraining or blocking operation whenever one of the voltages $V_{XN}$, $V_{YN}$ or $V_{ZN}$ is greater than 1.4 times each of the remaining voltages. For a close-in single-line-to-ground fault one of voltages $V_{XN}$, $V_{YN}$ or $V_{ZN}$ may be somewhat larger than the remainder of the voltages because of the compensator action. Preferably, the Zener diode DZ1 is selected to limit the restraining voltage thereacross to a small value compared to that of the voltage $V_{WO}$. As an example the maximum voltage across the Zener diode DZ1 may be of the order of fifteen volts as against a voltage of the order of 97 volts for the voltage $V_{WO}$ for a single-line-to-ground fault. Under such circumstances the voltage $V_{WO}$ exceeds the minimum of the voltages $V_{XN}$, $V_{YN}$ and $V_{ZN}$ by an amount sufficient to ensure operation of the circuit breaker for close-in single-line-to-ground faults despite the presence of the voltage across the Zener diode.

It should be noted that the equipment shown in FIGURE 1 lends itself admirably to zone packaging. For example, all equipment associated with the relay GF–1 may be packaged in a single casing to provide zone 1 protection. A separate casing may be employed for the equipment associated with each of the relays GF–2 and GF–3 to provide respectively zone 2 and zone 3 protection.

Figure 5:
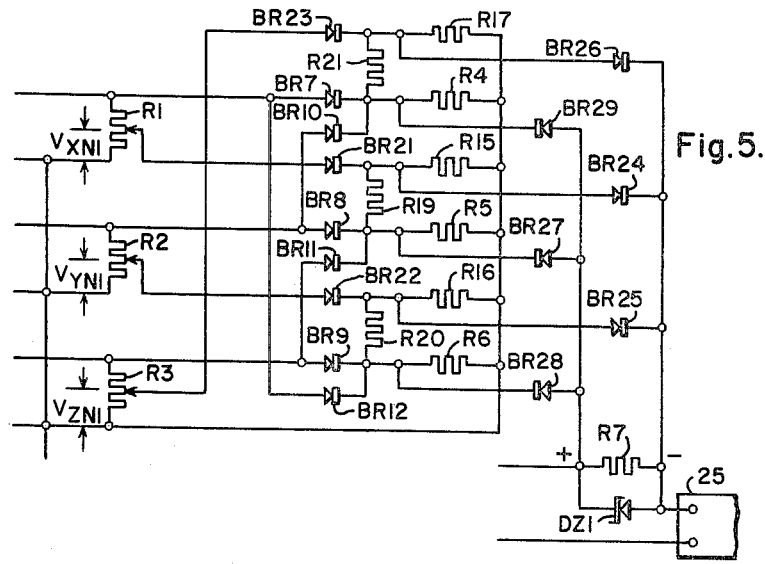
FIG. 5 is a schematic view showing modified circuits which may be employed for responding to the presence of a two-line-to-ground fault on the system of FIGURE 1.

In FIG. 1 the outputs of the rectifiers FR1, FR2 and FR3 are supplied to preferred circuits for detecting the presence of a two-line-to-ground fault. In FIG. 5 modified circuits are shown for the same purpose.

In FIG. 5 the three resistors R1, R2 and R3 of FIG. 1 are reproduced and are energized by the rectifiers FR1, FR2 and FR3 in the same way. In addition, the resistors R4, R5 and R6 also are reproduced and are energized in a similar manner.

A resistor R15 is connected across the lower portion of the resistor R1 through a rectifier BR21 for energization in accordance with the voltage $V_{XN1}$. A resistor R16 is connected through a rectifier BR22 across the lower portion of the resistor R2 for energization in accordance with the voltage $V_{YN1}$. A resistor R17 is connected through the rectifier BR23 for energization across a lower portion of the resistor R3 to produce a voltage $V_{ZN1}$ across the resistor R17.

The difference between the voltages across the resistors R5 and R15 appears across the resistor R19. Consequently, for a two-line-to-ground fault affecting lines B and C a substantial voltage appears across the resistor R19.

The difference between the voltages across the resistors R6 and R16 appears across the resistor R20. Consequently, for a two-line-to-ground fault involving lines A and C a substantial voltage appears across the resistor R20 with proper polarity for biasing purposes.

The difference between the voltages appearing across the resistors R4 and R17 appears across a resistor R21. Consequently, for a two-line-to-ground fault involving the lines A and B a substantial voltage appears across the resistor R21 with proper polarity for biasing purposes.

The upper terminals of the resistors R19, R20 and R21 are connected respectively through rectifiers BR24, BR25 and BR26 to the negative terminal of the resistor R7. The positive terminal of the resistor R7 is connected through the rectifiers BR27, BR28 and BR29, respectively, to the lower terminals of the resistors R19, R20 and R21. Consequently, a biasing voltage appears across the resistor R7 which depends on the largest voltage appearing across the resistors R19, R20 and R21.

Therefore, if the comparison circuits associated with the resistors R1, R2 and R3 in FIG. 1 are replaced by those shown in FIG. 5 a restraining or blocking bias appears across the resistor R7 upon occurrence of a two-line-to-ground fault adjacent the balance point of the line section to be protected.

Although the invention has been described with reference to certain specific embodiments thereof, numerous modifications falling within the spirit and scope of the invention are possible.

I claim as my invention:

1. In a relaying assembly for protecting a polyphase transmission line, a first set of input terminals suitable for energization by polyphase voltages, a second set of terminals suitable for energization by polyphase currents, means for deriving from said first set of input terminals a first quantity dependent on the zero-sequence component of polyphase voltages applied to said terminals, impedance means energized by a zero-sequence current derived from the second set of terminals when the last-named terminals are energized by polyphase currents for subtracting from said first quantity a second quantity dependent on a predetermined zero-sequence impedance drop to produce a compensated third quantity, impedance means including a plurality of impedances energized from the second set of terminals for producing a set of phase impedance voltage drops each corresponding to the flow of a separate one of a plurality of phase currents applied to the second set of terminals through one of said impedances, means for subtracting each of said phase impedance voltage drops from a corresponding phase voltage derived from the first set of terminals to produce a set of compensated fourth quantities, and output means for producing an output when said third quantity bears a predetermined relation to said fourth quantities.

2. In a relaying assembly for protecting a polyphase transmission line, a first set of input terminals suitable for energization by polyphase voltages, a second set of terminals suitable for energization by polyphase currents, means for deriving from said first set of input terminals a first quantity dependent on the zero-sequence component of polyphase voltages applied to said terminals, impedance means energized by a zero-sequence current derived from the second set of terminals when the last-named terminals are energized by polyphase currents for subtracting from said first quantity a second quantity dependent on a predetermined zero-sequence impedance drop to produce a compensated third quantity, impedance means including a plurality of impedance energized from the second set of terminals for producing a set of phase impedance voltage drops each corresponding to the flow of a separate one of a plurality of phase currents applied to the second set of terminals through one of said impedances, means for subtracting each of said phase impedance voltage drops from a corresponding phase voltage derived from the first set of terminals to produce a set of compensated fourth quantities, and output means for producing a predetermined output if the third quantity exceeds any one of the fourth quantities.

3. In a relaying assembly for protecting a polyphase transmission line, a first set of input terminals suitable for energization by polyphase voltages, a second set of terminals suitable for energization by polyphase currents, means for deriving from said first set of input terminals a first alternating quantity dependent on the zero-sequence component of polyphase voltages applied to said terminals, impedance means energized by a zero-sequence current derived from the second set of terminals when the last-named terminals are energized by polyphase currents for subtracting from said first alternating quantity a second alternating quantity dependent on a predetermined zero-sequence impedance drop to produce a compensated third alternating quantity, rectifying means for converting said third alternating quantity into a first direct quantity, impedance means including a plurality of impedances energized from the second set of terminals for producing a set of phase impedance alternating voltage drops each corresponding to the flow of a separate one of a plurality of phase currents applied to the second set of terminals through one of said impedances, means for subtracting each of said phase impedance alternating voltage drops from a corresponding phase voltage derived from the first set of terminals to produce a set of compensated fourth alternating quantities, rectifying means for converting each of said fourth alternating quantities into a second direct quantity, and output means for producing an output responsive to the difference between said first direct quantity and the smallest of said second direct quantities.

4. In a relaying assembly for protecting a polyphase transmission line, a first set of input terminals suitable for energization by polyphase voltages, a second set of terminals suitable for energization by polyphase currents, means for deriving from said first set of input terminals a first quantity dependent on the zero-sequence component of polyphase voltages applied to said terminals, impedance means energized by a zero-sequence current derived from the second set of terminals when the last-named terminals are energized by polyphase currents for subtracting from said first quantity a second quantity dependent on a predetermined zero-sequence impedance drop to produce a compensated third quantity, impedance means including a plurality of impedances energized from the second set of terminals for producing a set of phase impedance voltage drops each corresponding to the flow of a separate one of a plurality of phase currents applied to the second set of terminals through one of said impedances, means for subtracting each of said phase impedance voltage drops from a corresponding phase voltage derived from the first set of terminals to produce a set of compensated fourth quantities, and output means for producing an output when said third quantity bears a predetermined relation to said fourth quantities, and a control means dependent on a predetermined relation of one of said fourth alternating quantities relative to the remainder of said fourth alternating quantities for controlling the production of said output.

5. In a relaying assembly for protecting a polyphase transmission line, a first set of input terminals suitable for energization by polyphase voltages, a second set of terminals suitable for energization by polyphase currents, means for deriving from said first set of input terminals a first quantity dependent on the zero-sequence component of polyphase voltages applied to said terminals, impedance means energized by a zero-sequence current derived from the second set of terminals when the last-named terminals are energized by polyphase currents for subtracting from said first quantity a second quantity dependent on a predetermined zero-sequence impedance drop to produce a compensated third quantity, impedance means including a plurality of impedances energized from the second set of terminals for producing a set of phase impedance voltage drops each corresponding to the flow of a separate one of a plurality of phase currents applied to the second set of terminals through one of said impedances, means for subtracting each of said phase impedance voltage drops from a corresponding phase voltage derived from the first set of terminals to produce a set of compensated fourth quantities, and output means for producing a predetermined output if the third quantity exceeds any one of the fourth quantities, and control means effective when one of said fourth alternating quantities exceeds each of the remainder of the fourth alternating quantities for restraining production of said output.

6. A protective relaying combination for responding to certain faults on a three-phase transmission line, including: means energized from the line voltage at a relaying station for producing a derived three phase voltage for relaying purposes; a line drop compensating means connected in series circuit relation to the first-named means for energization by said derived three phase voltage for reproducing some aspect of the three-phase line voltage at some predetermined fault location in the transmission line to produce a three-phase compensated relaying voltage, means for deriving a quantity dependent on the zero-sequence component of said three-phase compensated relaying voltage, and translating means responsive to the difference between said quantity and the smallest phase voltage of said three-phase compensated relaying voltage.

7. A protective relaying combination for responding to certain faults on a three-phase transmission line, including: means energized from the line voltage at a relaying station for producing a derived three-phase voltage for relaying purposes; a line-drop compensating means connected in series circuit relation to the first-named means for energization by said derived three-phase voltage for reproducing some aspect of the three-phase line voltage at some predetermined fault location in the transmission line to produce a three-phase compensated relaying voltage, means for deriving a direct first quantity dependent on the zero-sequence component of said three-phase compensated relaying voltage, rectifying means for deriving from said three-phase compensated relaying voltage a set of direct second quantities each dependent on a separate phase voltage of said three phase compensated relaying voltage, and translating means responsive to the difference between said direct first quantity and the smallest of the second quantities.

8. A protective-relaying combination for responding to certain faults on a three-phase transmission line, including: means energized from the line voltage at a relaying station for producing a derived three-phase voltage for relaying purposes; a set of three line drop compensators connected in series circuit relation to the respective phases of said derived three phase voltages, and energized proportionately to the respective line currents in the corresponding line wires of the transmission line, each of the compensators having an impedance equal to the line impedance to a predetermined fault location to produce a three-phase compensated relaying voltage, zero-sequence dependent means energized from the three-phase line voltage at the relaying station for producing an alternating quantity dependent on the zero-sequence compononet of the three-phase line voltage, line drop compensating means connected in series circuit relation to said zero-sequence dependent means for energization by said alternating quantity, and energized proportionately to the zero-sequence component of the line currents of the transmission line, the last-named compensator having an impedance equal to the corresponding line impedance to the predetermined fault location to produce a zero-sequence relaying voltage, and translating means responsive to the difference between said zero-sequence relaying voltage and the smallest of the phase voltages of said three-phase compensated relaying voltage.

9. A protective-relaying combination for responding to certain faults on a three-phase transmission line, including: means energized from the line voltage at a relaying station for producing a derived three-phase voltage for relaying purposes; a set of three line drop compensators connected in series circuit relation to the respective phases of said derived three phase voltages, and energized proportionately to the respective line currents in the corresponding line wires of the transmission line, each of the compensators having an impedance equal to the line impedance to a predetermined fault location to produce a three-phase compensated relaying voltage, means energized from the three-phase line voltage at the relaying station for producing an alternating quantity dependent on the zero-sequence component of the three-phase line voltage, line drop compensating means connected in series circuit relation to said alternating quantity, and energized proportionately to the zero-sequence component of the line currents of the transmission line, the last-named compensator having an impedance equal to the corresponding line impedance to the predetermined fault location to produce a zero-sequence relaying voltage, three resistors, rectifying means for rectifying each phase voltage of said three phase compensated relaying voltage, to produce three rectified phase relaying voltages respectively across said resistors, rectifying means for rectifying said zero-sequence relaying voltage to a pair of first terminals, a separate rectifier connected in series with each of said resistors across said terminals, each of said resistors being connected to apply voltage of the same polarity between said terminals, each of said rectifiers being connected to block current flow between said terminals due to the voltage across the associated resistor, a pair of second terminals, a load, means connecting across the second terminals said rectified zero-sequence relaying voltage in series with the load and said first terminals, said connecting means placing said rectified zero-sequence relaying voltage in opposition to the voltage across each of the resistors, whereby current flows through said load when the rectified zero-sequence relaying voltage exceeds the effective voltage across any of said resistors.

10. A protective-relaying combination for responding to certain faults on a three-phase transmission line having a relaying station, including: means located at said relaying station for producing quantities dependent on the zero-sequence voltage present at a predetermined point on the transmission line substantially displaced from the relaying station, means located at said relaying station for producing quantities dependent on the phase voltages of said transmission line at such predetermined point, and translating means located at the relaying station and energized by said quantities for response to the difference between the zero-sequence voltage and the smallest of said phase voltages.

11. A protective-relaying combination for responding to certain faults on a three-phase transmission line having a relaying station, including: means located at said relaying station for producing quantities dependent on the zero-sequence voltage present at a predetermined point on the transmission line substantially displaced from the relaying station, means located at said relaying station for producing quantities dependent on the phase voltages of said transmission line at such predetermined point, and translating means located at the relaying station and energized by said quantities for response to the difference between the zero-sequence voltage and the smallest of said phase voltages, and means responsive to conditions present when a two-line-to-ground fault occurs on the transmission line for modifying the response of said translating means to the energization by said quantities.

12. A protective-relaying combination for responding to certain faults on a three-phase transmission line having a relaying station, including: means located at said relaying station for producing quantities dependent on the zero-sequence voltage present at a predetermined point on the transmission line substantially displaced from the relaying station, means located at said relaying station for producing quantities dependent on the phase voltages of said transmission line at such predetermined point, and translating means located at the relaying station and energized by said quantities for response to the difference between the zero-sequence voltage and the smallest of said phase voltages, said transmission line upon occurrence of a two-line-to-ground fault thereon having voltage and current values for the unfaulted line which differ from the voltage and current values for the faulted lines, and means responsive to the difference between one of said values for one of the lines and the corresponding values for both of the remaining lines for restraining said response of the translating means.

13. In a relaying assembly for protecting a polyphase transmission line, a first set of input terminals suitable for energization by polyphase voltages, a second set of terminals suitable for energization by polyphase currents, means for deriving from said first set of input terminals a first alternating quantity dependent on the zero-sequence component of polyphase voltages applied to said terminals, impedance means energized by a zero-sequence current derived from the second set of terminals when the last-named terminals are energized by polyphase currents for subtracting from said first alternating quantity a second alternating quantity dependent on a predetermined zero-sequence impedance drop to produce a compensated third alternating quantity, rectifying means for converting said third alternating quantity into a first direct quantity, impedance means including a plurality of impedances energized from the second set of terminals for producing a set of phase impedance alternating voltage drops each corresponding to the flow of a separate one of a plurality of phase currents applied to the second set of terminals through one of said impedance means for subtracting each of said phase impedance alternating voltage drops from a corresponding phase voltage derived from the first set of terminals to produce a set of compensated fourth alternating quantities, rectifying means for converting each of said fourth alternating quantities into a second direct quantity, and output means for producing an output responsive to the difference between said first direct quantity and the smallest of said second direct quantities, means for comparing each of said second direct quantities with the remainder of the direct quantities, and means responsive to a predetermined deviation in magnitude in a predetermined direction of any one of said second direct quantities from each of the remaining second direct quantities for restraining production of said output.

References Cited by the Examiner
UNITED STATES PATENTS 2,408,208  9/46  Goldsborough _____ 317—18
2,445,429  7/48  Goldsborough _____ 317—18

SAMUEL BERNSTEIN, *Primary Examiner.*